(12) United States Patent
Zhang

(10) Patent No.: US 9,397,802 B2
(45) Date of Patent: *Jul. 19, 2016

(54) CYCLIC SHIFT DELAY TECHNIQUES FOR WLAN MULTI-RADIO DEVICES

(71) Applicant: Marvell World Trade Ltd., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 65 days.

This patent is subject to a terminal disclaimer.

(21) Appl. No.: 14/147,363

(22) Filed: Jan. 3, 2014

(65) Prior Publication Data

US 2014/0119464 A1    May 1, 2014

Related U.S. Application Data

(63) Continuation of application No. 13/335,789, filed on Dec. 22, 2011, now Pat. No. 8,625,561.

(60) Provisional application No. 61/430,428, filed on Jan. 6, 2011.

(51) Int. Cl.
*H04W 4/00*     (2009.01)
*H04L 5/00*     (2006.01)
(Continued)

(52) U.S. Cl.
CPC ............ *H04L 5/0037* (2013.01); *H04B 7/0417* (2013.01); *H04B 7/0671* (2013.01);
(Continued)

(58) Field of Classification Search
CPC ..... H04L 5/0037; H04L 5/001; H04L 5/0014; H04L 5/0023; H04L 5/0039; H04L 5/0041; H04L 27/2633; H04L 27/18; H04B 7/0417; H04B 7/0626; H04B 7/0671; H04B 7/12
See application file for complete search history.

(56) References Cited

U.S. PATENT DOCUMENTS 6,845,090 B1    1/2005    Takabatake et al.
7,545,832 B2    6/2009    Ito et al.
(Continued)

FOREIGN PATENT DOCUMENTS

WO    2007117949    10/2007
WO    2011/040789    4/2011

OTHER PUBLICATIONS

"DRAFT Supplement to STANDARD [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g, 2003, 69 pages.

(Continued)

*Primary Examiner* — Clemence Han

(57) ABSTRACT

The present disclosure includes systems and techniques relating to wireless devices. A described technique includes generating respective frequency segments of a composite signal which are contiguous in a frequency domain, each of the respective frequency segments being based on a segment bandwidth; applying respective cyclic shift delay (CSD) phase shifts to the respective frequency segments to produce respective output signals; and transmitting the composite signal by transmitting signals that are based on the respective output signals. The respective CSD phase shifts, including first and second CSD phase shifts, are equivalent to third CSD phase shifts that correspond to a contiguous non-composite signal having a single frequency segment. A bandwidth of the single frequency segment is at least twice the segment bandwidth. The respective CSD phase shifts are applied such that a device receiving the composite signal uses the third CSD phase shifts that correspond to the contiguous non-composite signal.

23 Claims, 10 Drawing Sheets

(51) Int. Cl.

| | | |
|---|---|---|
| *H04B 7/04* | (2006.01) | |
| *H04B 7/12* | (2006.01) | |
| *H04L 27/26* | (2006.01) | |
| *H04L 27/18* | (2006.01) | |
| *H04B 7/06* | (2006.01) | |

(52) U.S. Cl.
CPC ............... *H04B 7/12* (2013.01); *H04L 5/001* (2013.01); *H04L 5/0014* (2013.01); *H04L 5/0023* (2013.01); *H04L 5/0039* (2013.01); *H04L 5/0041* (2013.01); *H04L 27/18* (2013.01); *H04L 27/2633* (2013.01); *H04B 7/0626* (2013.01)

(56) References Cited

U.S. PATENT DOCUMENTS

| | | | |
|---|---|---|---|
| 7,804,800 | B2 | 9/2010 | Li et al. |
| 7,920,599 | B1 * | 4/2011 | Subramanian et al. ........ 370/509 |
| 7,953,115 | B2 | 5/2011 | Nataga et al. |
| 8,379,757 | B1 | 2/2013 | Zhang |
| 2007/0008946 | A1 * | 1/2007 | Kim .............................. 370/345 |
| 2007/0153754 | A1 | 7/2007 | Shapira et al. |
| 2009/0232124 | A1 | 9/2009 | Cordeiro et al. |
| 2009/0316807 | A1 * | 12/2009 | Kim et al. ...................... 375/260 |
| 2010/0075693 | A1 * | 3/2010 | Kishigami et al. .......... 455/452.2 |
| 2010/0157901 | A1 * | 6/2010 | Sanderovitz et al. ......... 370/328 |
| 2010/0208712 | A1 * | 8/2010 | Wax et al. ...................... 370/338 |
| 2010/0248635 | A1 | 9/2010 | Zhang et al. |
| 2010/0260138 | A1 | 10/2010 | Liu et al. |
| 2010/0260159 | A1 | 10/2010 | Zhang et al. |
| 2010/0284393 | A1 | 11/2010 | Abraham et al. |
| 2010/0290449 | A1 | 11/2010 | Van Nee et al. |
| 2010/0329283 | A1 * | 12/2010 | Luo et al. ...................... 370/480 |
| 2011/0038332 | A1 | 2/2011 | Liu et al. |
| 2011/0069775 | A1 * | 3/2011 | Wu et al. ...................... 375/267 |
| 2011/0299514 | A1 | 12/2011 | Kwon |
| 2011/0305178 | A1 * | 12/2011 | Zheng et al. .................. 370/311 |
| 2011/0305194 | A1 | 12/2011 | Zheng et al. |
| 2012/0051454 | A1 * | 3/2012 | Zheng et al. .................. 375/295 |

OTHER PUBLICATIONS

"IEEE P802.11—Wireless LANs—Proposed TGac Draft Amendment", IEEE 802.11 TGac, Doc. # IEEE 802.11-10/1361r0, Nov. 2010, 130 pages.

"Information technology—Telecommunications and information exchange between systems—Local and metropolitan area networks—Specific requirements—Part 11: Wireless LAN Medium Access Control (MAC) and Physical Layer (PHY) specifications", IEEE Std 802.11, 1999, 531 pages.

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band", IEEE Std. 802.11b, 1999, 96 pages.

"TGn Sync Proposal Technical Specification", IEEE Std. 802.11n, 2005, 131 pages.

Cariou et al., "Multi-Channel Transmissions," 802.11 TGac, IEEE, 802.11-09/1022r0, Sep. 21, 2009, 13 pages.

Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 536 pages.

Rosken, Wilfriend, Authorized Officer, European Patent Office, PCT International Application No. PCT/US2010/056619, in International Search Report mailed Mar. 2, 2011, 10 pages.

Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks, IEEE Std 802.3ac-1998, 19 pages.

Zhang et al., "Exploiting Multi-Antennas for Opportunistic Spectrum Sharing in Cognitive Radio Networks," IEEE the 18th Annual IEEE International Symposium on Personal, Indoor and Mobile Radio Communications (PIMRC), 2007, 5 pages.

Zhang et al., "Narrow-Band OFDM Mode for WLAN," U.S. Appl. No. 12/789,325, filed May 27, 2010, to be published by the USPTO, 66 pages.

Lanante et. al., "IEEE802.11ac Preamble with Legacy 802.11a/n Backward Compatibility", IEEE 802.11-YY/0847RO, Jul. 14, 2009, pp. 1-18.

Wahyul Amien Syafei et. al., "A design of next generation Gigabit MIMO wireless LAN system", 12th International Conference on Advanced Communication Technology (ICACT), IEEE, Feb. 7, 2010, pp. 941-946.

Robert Stacey, "Proposed Specification Framework for TGac", Jul. 15, 2010, pp. 1-22.

Filip, Hannelore, Authorized Officer, European Patent Office, PCT International Application No. PCT/US2011/066964, in International Search Report mailed Mar. 28, 2012, 15 pages.

International Search Report and Written Opinion for App. Ser. No. PCT/US2010/029275, mailed Aug. 12, 2010, 14 pages.

\* cited by examiner

CYCLIC SHIFT DELAY TECHNIQUES FOR WLAN MULTI-RADIO DEVICES

CROSS REFERENCE TO RELATED APPLICATIONS

This disclosure is a continuation of and claims the benefit of the priority of U.S. patent application Ser. No. 13/335,789, filed Dec. 22, 2011 and entitled "CYCLIC SHIFT DELAY TECHNIQUES FOR WLAN MULTI-RADIO DEVICES" (now U.S. Pat. No. 8,625,561), which claims the benefit of the priority of U.S. Provisional Application Ser. No. 61/430,428, filed Jan. 6, 2011 and entitled "160 MHz CSD IN 802.11ac." The disclosures of the above-identified applications are incorporated herein by reference in their entirety.

BACKGROUND

Wireless Local Area Networks (WLANs) include multiple wireless communication devices that communicate over one or more wireless channels. When operating in an infrastructure mode, a wireless communication device called an access point (AP) provides other wireless communication devices—e.g., client stations or access terminals (AT)—connectivity with a network such as the Internet. Various examples of wireless communication devices include mobile phones, smart phones, wireless routers, wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones. Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. WLANs such as those defined in the Institute of Electrical and Electronics Engineers (IEEE) wireless communications standards, e.g., IEEE 802.11a or IEEE 802.11n, can use OFDM to transmit and receive signals. Moreover, WLANs, such as ones based on the IEEE 802.11n standard, can use OFDM and MIMO.

SUMMARY

The present disclosure includes systems, apparatuses, and techniques for wireless local area networks. A described technique for wireless local area networks includes configuring separate radio pathways, including a first radio pathway and a second radio pathway that are operable for either contiguous frequency transmissions or non-contiguous frequency transmissions, to collectively produce a composite signal in a contiguous frequency mode. The technique includes generating, via the first radio pathway, a first frequency segment of the composite signal in accordance with a segment bandwidth, generating, via the second radio pathway, a second frequency segment of the composite signal in accordance with the segment bandwidth, the second frequency segment being contiguous with the first frequency segment in a frequency domain; applying, via the first radio pathway, first cyclic shift delay (CSD) phase shifts to the first frequency segment to produce a first output signal; and applying, via the second radio pathway, second CSD phase shifts to the second frequency segment to produce a second output signal; and transmitting the composite signal by transmitting signals comprising the first output signal and the second output signal. The first CSD phase shifts and the second CSD phase shifts are equivalent to CSD phase shifts that correspond to a contiguous non-composite signal having a single frequency segment. The first CSD phase shifts and the second CSD phase shifts are applied such that a device receiving the composite signal uses the CSD phase shifts that correspond to the contiguous non-composite signal.

A wireless communication device can include a first radio unit that is operable for either contiguous frequency transmissions or non-contiguous frequency transmissions, and a second radio unit that is operable for either contiguous frequency transmissions or non-contiguous frequency transmissions. The first radio unit can be configured to generate a first frequency segment of a composite signal in accordance with a segment bandwidth, and apply first cyclic shift delay (CSD) phase shifts to the first frequency segment to produce a first output signal. The second radio unit can be configured to generate a second frequency segment of the composite signal in accordance with the segment bandwidth, and apply second CSD phase shifts to the second frequency segment to produce a second output signal, the second frequency segment being contiguous with the first frequency segment in a frequency domain. The device can include processor electronics configured to control the radio units to collectively produce the composite signal in a contiguous frequency mode. The first CSD phase shifts and the second CSD phase shifts are equivalent to CSD phase shifts that correspond to a contiguous non-composite signal having a single frequency segment. The first CSD phase shifts and the second CSD phase shifts are applied such that a device receiving the composite signal uses the CSD phase shifts that correspond to the contiguous non-composite signal.

A system for wireless communications can include a first radio unit that is operable for either contiguous frequency transmissions or non-contiguous frequency transmissions, the first radio unit being configured to generate a first frequency segment of a composite signal in accordance with a segment bandwidth, and apply first cyclic shift delay (CSD) phase shifts to the first frequency segment to produce a first output signal. The system can include a second radio unit that is operable for either contiguous frequency transmissions or non-contiguous frequency transmissions, the second radio unit being configured to generate a second frequency segment of the composite signal in accordance with the segment bandwidth, and apply second CSD phase shifts to the second frequency segment to produce a second output signal, the second frequency segment being contiguous with the first frequency segment in a frequency domain. The first CSD phase shifts and the second CSD phase shifts are equivalent to CSD phase shifts that correspond to a contiguous non-composite signal having a single frequency segment. The first CSD phase shifts and the second CSD phase shifts are applied such that a device receiving the composite signal uses the CSD phase shifts that correspond to the contiguous non-composite signal. The system can include circuitry to produce the composite signal based on a summation of the first output signal and the second output signal, and distribute the composite signal to one or more antenna interfaces. The system can include processor electronics configured to control the radio units to collectively produce the composite signal in a contiguous frequency mode.

These and other implementations can include one or more of the following features. The processor electronics can be configured to set, within the first radio unit, a first CSD offset for the first frequency segment, where the first CSD phase shifts are based on the first CSD offset. The processor electronics can be configured to set, within the second radio unit, a second CSD offset for the second frequency segment, where the second CSD phase shifts are based on the second CSD offset. In some implementations, a composite bandwidth of the composite signal is equal to twice the segment bandwidth. In some implementations, the segment bandwidth is 80 MHz. In some implementations, the composite bandwidth is 160 MHz. The processor electronics can be configured to control a transmission of an indicator to provide information regarding an application of CSD phase shifts to the composite signal.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
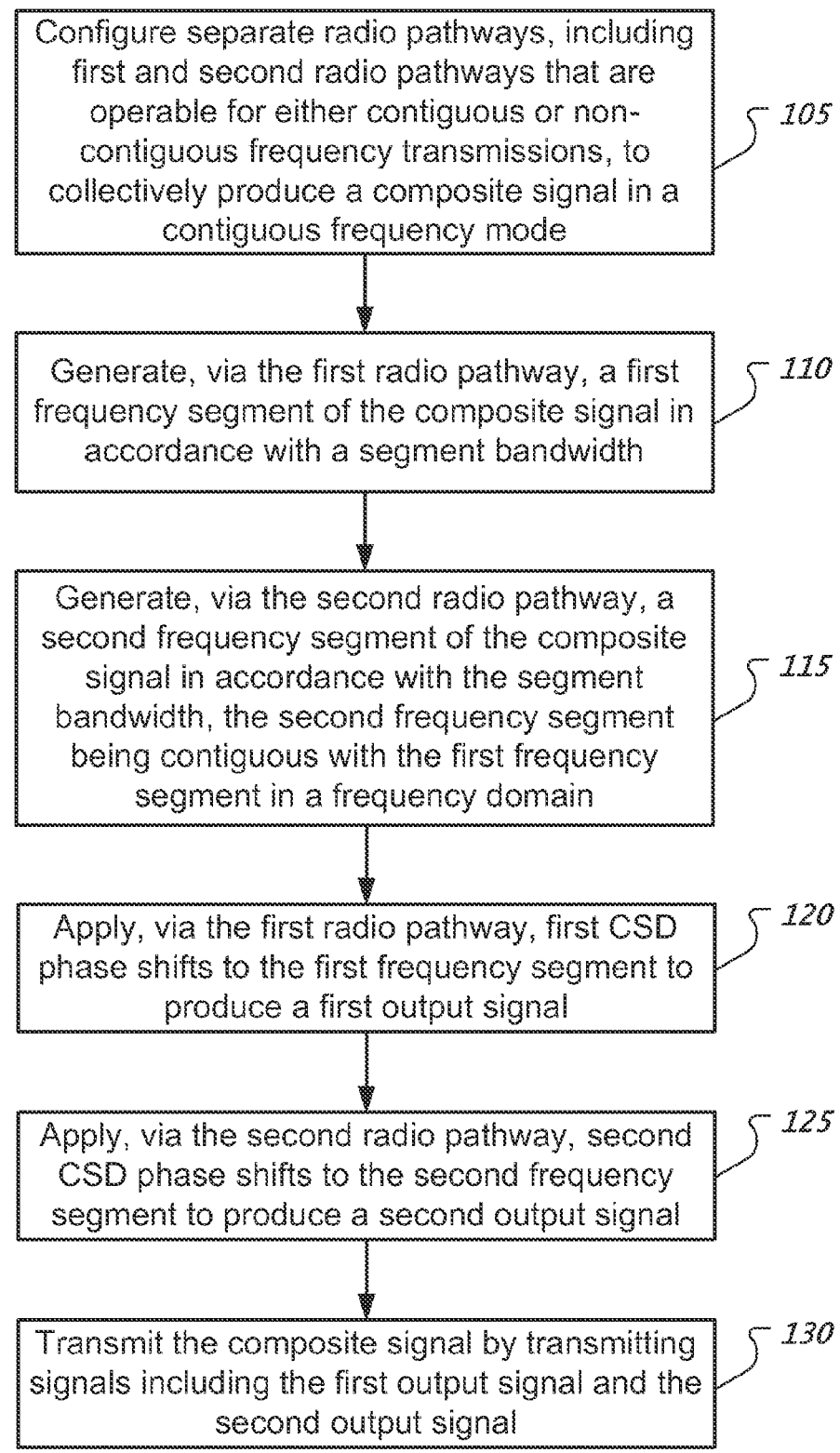
FIG. 1 shows an example of a communication process associated with a wireless communication device that supports contiguous and non-contiguous transmissions.

A wireless standard such as IEEE 802.11n and IEEE 802.11ac provides for contiguous transmissions and non-contiguous transmissions. For a 160 MHz contiguous transmission, a contiguous 160 MHz chunk of radio spectrum is required. For a 160 MHz non-contiguous transmission (referred to as 80+80 non-contiguous transmission), two non-contiguous 80 MHz chunks of radio spectrum are required. Note that devices configured for 80+80 non-contiguous transmissions may increase the likelihood of 160 MHz transmissions by using non-contiguous 80 MHz chunks of radio spectrum, since it may be easier to locate two free smaller non-contiguous chunks of radio spectrum than a single free larger contiguous chunk of radio spectrum. Typically, 80+80 non-contiguous transmissions require, within a single device, two radio units for communications.

Contiguous and non-contiguous 160 MHz transmissions can have the same transmission flow before the inverse Fast Fourier Transform (IFFT) of an OFDM communication process. In some implementations, the transmissions have joint encoding, but separate 80 MHz interleaving. For example, a data signal can be encoded the same way for either a contiguous or non-contiguous transmission. Each 80 MHz segment of a 160 MHz transmission can have exactly the same tone mappings as a standalone 80 MHz signal. For a non-contiguous 160 MHz transmission, two 256-point IFFTs can be applied in each transmission path, instead of a 512-IFFT in the case of a contiguous 160 MHz transmission.

In addition, the wireless standard can employ cyclic shift delay (CSD) the frequency domain to reduce the chance of unintentional beamforming effects at the transmission side. A CSD is equivalent to a linear phase roll on different tones. In the example of a very high throughput (VHT) data portion expression, the phase of the tone index k is determined by the relative frequency of the current tone to the carrier frequency:

$$r_{VHT\text{-}DATA}^{(i_{Seg},i_{TX})}(t) = \frac{1}{\sqrt{N_{VHT\text{-}DATA}^{Tones} N_{STS,total}}} \sum_{n=0}^{N_{SYM}-1} w_{T_{SYM}}(t - nT_{SYM}) \cdot$$

$$\sum_{u=0}^{N_u-1} \sum_{k=-N_{SR}}^{N_{SR}} \sum_{m=1}^{N_{STS,u}} \left[Q_k^{(i_{Seg})}\right]_{i_{TX},(M_u+m)} Y_{k,BW}\left(\tilde{D}_{k,i_{STS,u},n}^{(u)} + p_{n+z}P_n^k\right) \cdot$$

$$\exp(j2\pi k\Delta_F(t - nT_{SYM} - T_{GI} - T_{CS,VHT}(M_u + m)))$$

where $T_{CS,VHT}$ represents an equivalent phase shift due to CSD at tone index k and the $i_{STS}$ space-time stream (e.g., $\theta_k(i_{STS}) = -2\pi k \Delta_F T_{CS,VHT}(i_{STS})$). Note that $r_{VHT\text{-}DATA}^{(i_{Seg},i_{TX})}(t)$ is the baseband transmit signal from the transmit antenna $i_{TX}$ and in the frequency segment $i_{seg}$ (upper or lower 80 MHz). Note that $N_{SYM}$ is the number of symbols in a data field, $T_{SYM}$ is a symbol interval, $T_{GI}$ is a guard interval duration, $N_{STS,total}$ is the total number of space-time streams in a packet, $N_u$ represents the number of users associated with the transmission, $N_{SR}$ is the highest data subcarrier index per frequency segment, $\Delta_F$ is a subcarrier frequency spacing, $Q_k^{(i_{Seg})}$ is a spatial mapping matrix for the subcarrier k in the frequency segment $i_{seg}$, $Y_{k,BW}$ represents a function for tone rotation, $T_{CS,VHT}$ represents a cyclic shift per space-time stream, and $P_n^k$ is a pilot mapping for subcarrier k for symbol n.

The wireless standard can define that each 80 MHz segment transmit as a 80 MHz signal with the corresponding radio, hence the CSD phase shift(s) in each segment is relative to the corresponding carrier frequency:

$$r_{RF}(t) = Re\left\{\frac{1}{\sqrt{N_{Seg}}} \sum_{i_{seg}=0}^{N_{Seg}-1} r^{(i_{Seg})}(t)\exp\left(j2\pi f_c^{(i_{Seg})}t\right)\right\}$$

where $r_{RF}(t)$ is the transmitted radio frequency signal and $N_{Seg}$ the number of frequency segments included in the transmit signal. Typically, $N_{Seg}$ is set to one for contiguous transmissions and set to two for a non-contiguous transmission using two segments. Consequently, in a 80+80 non-contiguous transmission, each 80 MHz segment (e.g., a lower frequency segment "LSB" and upper frequency segment "USB") applies 80 MHz CSD phase shifts at baseband independently (e.g., LSB and USB 80 MHz segments repeat the same CSD phase shifts at the same relative tone index and the same stream index).

Further, the wireless standard can define a transmit beamforming protocol, where a sounding packet is sent from a beam-former (e.g., a transmitting wireless device) to a beam-formee (e.g., a receiving wireless device), so that the beam-formee is able to perform channel estimation and compute a steering matrix. In some implementations, the beam-former computes a steering matrix based on feedback from the beam-formee. Consequently, the beam-formee should know the applied CSD phase shift value of each tone, so that it can remove the CSD of the channel estimation from the sounding packet to compute the accurate channel estimation without a CSD phase shift.

Adjacent frequency segments can be symmetric with a guard tone (e.g., a zero tone) at the boundary there between. A device supporting a 80+80 non-contiguous transmission mode can use two radio units to transmit or receive a contiguous 160 MHz signal. Such a device can apply 80 MHz CSD phase shifts to a LSB 80 MHz segment having a LSB carrier frequency and apply 80 MHz CSD phase shifts to a USB 80 MHz segment having a USB carrier frequency. A device not supporting a 80+80 non-contiguous mode can use a single radio to transmit or receive a contiguous 160 MHz signal. Such a device can apply 160 MHz CSD phase shifts based on a carrier frequency of a 160 MHz contiguous mode. To support both types of devices, a beam-formee should know the values of the CSD phase shift in each tone, so that the beam-formee can remove the phase shift. This disclosure describes, among other things, techniques and systems to provide interoperability among devices with varying levels of support for non-contiguous transmissions.

FIG. 1 shows an example of a communication process associated with a wireless communication device that supports contiguous and non-contiguous transmissions. At 105, the process includes configuring separate radio pathways to collectively produce a composite signal in a contiguous frequency mode. The radio pathways include first and second radio pathways that are operable for either contiguous or non-contiguous frequency transmissions. Configuring the radio pathways can include setting, in the first radio pathway, a first CSD offset for the first frequency segment, the first CSD phase shifts being based on the first CSD offset. Configuring the radio pathways can include setting, in the second radio pathway, a second CSD offset for the second frequency segment, the second CSD phase shifts being based on the second CSD offset. In some implementations, a composite bandwidth of the composite signal is equal to twice the segment bandwidth.

At 110, the process includes generating, via the first radio pathway, a first frequency segment of the composite signal in accordance with a segment bandwidth. At 115, the process includes generating, via the second radio pathway, a second frequency segment of the composite signal in accordance with the segment bandwidth, the second frequency segment being contiguous with the first frequency segment in a frequency domain. In some implementations, each of the first frequency segment and the second frequency segment include OFDM tones.

At 120, the process includes applying, via the first radio pathway, first CSD phase shifts to the first frequency segment to produce a first output signal. At 125, the process includes applying, via the second radio pathway, second CSD phase shifts to the second frequency segment to produce a second output signal. The first CSD phase shifts and the second CSD phase shifts are equivalent to CSD phase shifts that correspond to a contiguous non-composite signal having a single frequency segment. For example, the process can use contiguous 160 MHz CSD phase shift values to produce the output signals. The first radio pathway can generate 160 MHz CSD phase shifts for the first frequency segment based on 80 MHz CSD phase shifts and a first phase shift value, whereas the second radio pathway can generate 160 MHz CSD phase shifts for the second frequency segment based on 80 MHz CSD phase shifts and a second phase shift value. The first radio pathway is different than the second radio pathway. The first radio pathway can include first hardware that stores the first phase shift value. The second radio pathway can include second hardware that stores the second phase shift value. In some implementations, the first and second phase shift values are different and are based on respective predetermined constants. In some implementations, the first and second phase shift values are the same and are a predetermined constant.

At 130, the process includes transmitting the composite signal by transmitting signals including the first output signal and the second output signal. Transmitting the composite signal can include summing the first output signal and the second output signal, and transmitting the summed signal via one or more antennas. In some implementations, the process includes transmitting an indicator to provide information regarding an application of CSD phase shifts to the composite signal. In some implementations, the first CSD phase shifts and the second CSD phase shifts are applied such that a device receiving the composite signal uses the CSD phase shifts that correspond to the contiguous non-composite signal.

Figure 2:
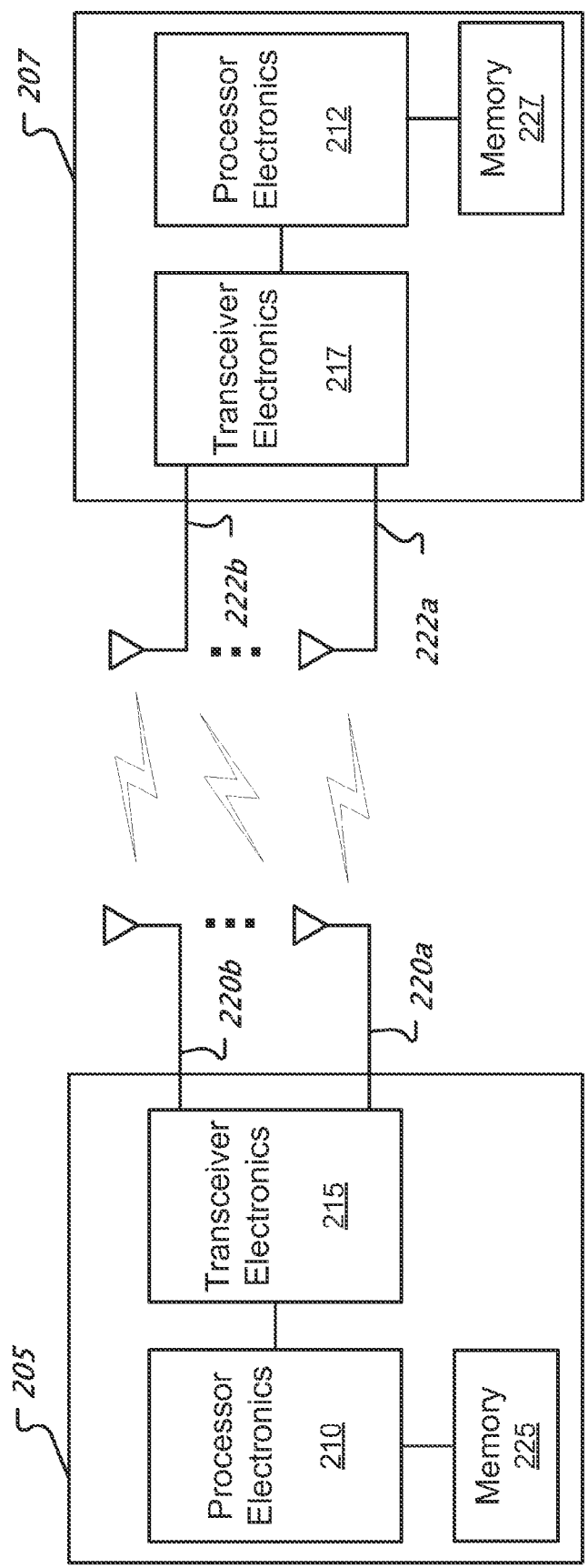
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include one or more analog circuits. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

In some implementations, a first wireless communication device 205 can transmit data to one or more devices via two or more spatial wireless communication channels such as orthogonal spatial subspaces, e.g., orthogonal Space Division Multiple Access (SDMA) subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency band.

Wireless communication devices, such as a MIMO enabled access point, can transmit signals for multiple client wireless communication devices at the same time in the same frequency band by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
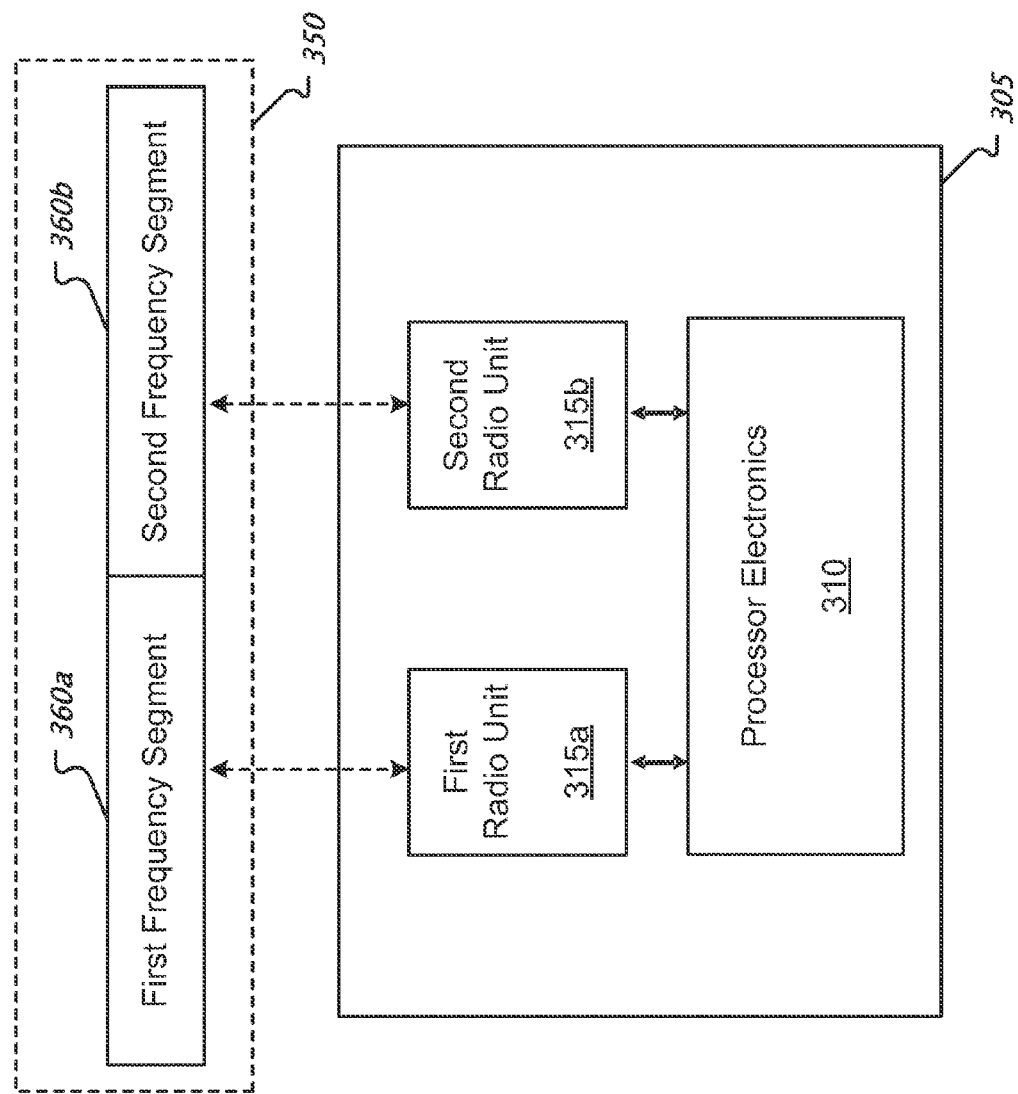
FIG. 3 shows an example of a multi-radio wireless communication device and a layout of a composite signal that is produced by separate radio units of the device.

FIG. 3 shows an example of a multi-radio wireless communication device and a layout of a composite signal that is produced by separate radio units of the device. A multi-radio wireless communication device 305 includes processor electronics 310 in communication with two or more radio units 315a, 315b. Processor electronics 310 can include one or more processors. In some implementations, processor electronics 310 include specialized logic to perform one or more specific functions. The processor electronics 310 can operate the radio units 315a-b to transmit and receive communication signals. The radio units 315a-b can generate different portions of a composite signal 350 that includes a first frequency segment 360a and a second frequency segment 360b. For example, the first radio unit 315a generates an output signal based on the first frequency segment 360a, whereas the second radio unit 315b generates an output signal based on the second frequency segment 360b. In some implementations, the device 305 includes circuitry to produce the composite signal based on a summation of the output signal of the first radio unit 315a and the output signal of the second radio unit 315b, and distributes the composite signal to one or more antenna interfaces.

In some implementations, the radio units 315a-b can concurrently receive different physical layer frames of a data packet. For example, the first radio unit 315a can receive communication signals that include one or more signals indicative of a first physical layer frame of a data packet. The first radio unit 315a can produce a first output based on the first physical layer frame. The second radio unit 315b can receive communication signals that include one or more signals indicative of a second physical layer frame of the data packet. The second radio unit 315b can produce a second output based on the second physical layer frame. Processor electronics 310 can combine information based on the first and second outputs of the radio units 315a-b to resolve the data packet.

Figure 4:
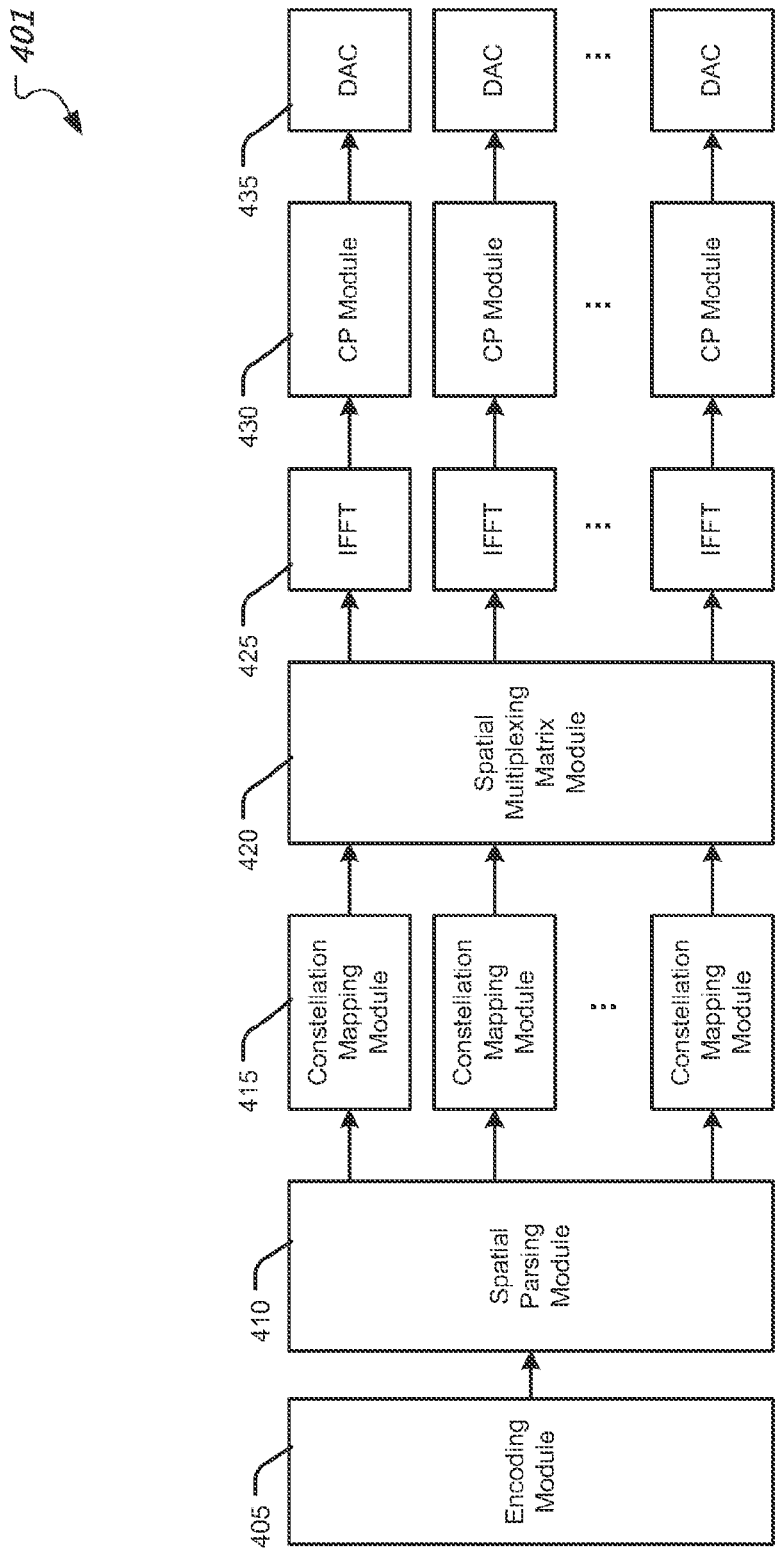
FIG. 4 shows an example of a functional block diagram of a transmit path of wireless communication device.

FIG. 4 shows an example of a functional block diagram of a transmit path of wireless communication device. In this example, a transmit path 401 of a wireless communication device is configured for MIMO communications. A wireless communication device can include multiple transmit paths. A transmit path 401 can include an encoding module 405 configured to receive a data steam, such as an audio data stream, a video data stream, or combination thereof. The encoding module 405 outputs encoded bit streams to a spatial parsing module 410, which performs spatial mapping to produce multiple outputs.

Outputs of the spatial parsing module 410 are input into constellation mapping modules 415, respectively. In some implementations, a constellation mapping module 415 includes a serial-to-parallel converter that converts an incoming serial stream to multiple parallel streams. The constellation mapping module 415 can perform quadrature amplitude modulation (QAM) on multiple streams produced by a serial-to-parallel conversion. The constellation mapping module 415 can output OFDM tones that are input to a spatial multiplexing matrix module 420. The spatial multiplexing matrix module 420 can multiply the OFDM tones by a spatial multiplexing matrix to produce signal data for multiple transmit antennas.

Outputs of the spatial multiplexing matrix module 420 are input to IFFT modules 425. Outputs of the IFFT modules 425 are input to cyclic prefix (CP) modules 430. Outputs of the CP modules 430 are input to digital-to-analog converters (DACs) 435, which produce analog signals for transmission on multiple transmit antennas, respectively.

Figure 5:
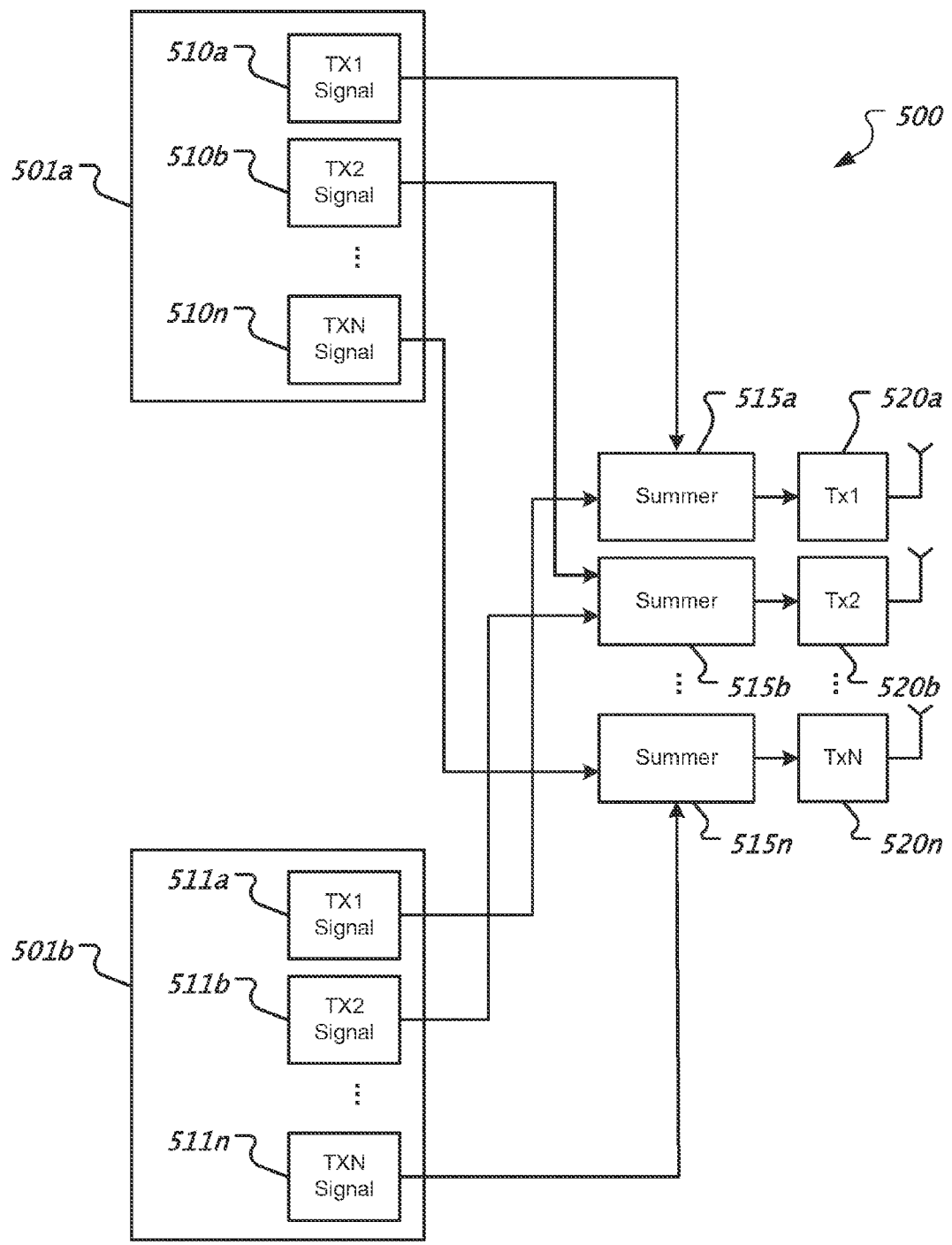
FIG. 5 shows an example of an architecture that combines multiple transmission signals from separate radio units for transmission on multiple antennas.

FIG. 5 shows an example of an architecture that combines multiple transmission signals from separate radio units for transmission on multiple antennas. A device 500 can include two or more radio units with respective two or more radio pathways such as transmit paths 501a, 501b that are each configured for MIMO communications. A first transmit path 501a generates multiple transmit signals 510a, 510b, 510n for transmission on multiple transmit antennas 520a, 520b, 520n, respectively. A second transmit path 501b generates multiple transmit signals 511a, 511b, 511n for transmission on multiple transmit antennas 520a-n, respectively. The device 500 can include multiple summers 515a, 515b, 515n that are associated with multiple transmit antennas 520a-n respectively. In some implementations, summers 515a-n sum corresponding outputs of DACs in each of the transmit paths 501a-b to produce combined transmit signals for each of the antennas 520a-n.

Figure 6A:
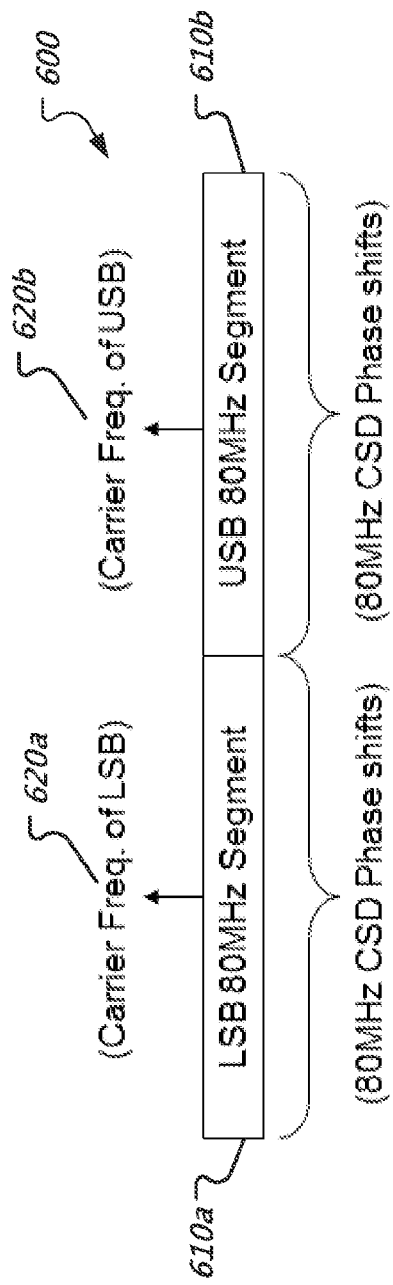
FIG. 6A shows a layout of an example of a 160 MHz composite signal having contiguous frequency segments with separate CSD phase shifts and separate carrier frequencies.

FIG. 6A shows a layout of an example of a 160 MHz composite signal having contiguous frequency segments with separate CSD phase shifts and separate carrier frequencies. The composite signal 600 includes two frequency segments 610a, 610b. The segments 610a-b include a LSB 80 MHz segment 610a and a USB 80 MHz segment 610b. The LSB 80 MHz segment 610a is produced based on a carrier frequency 620a for the LSB. The USB 80 MHz segment 610b is produced based on a carrier frequency 620b for the USB. Radio units of a device can generate the frequency segments 610a-b, respectively, using 80 MHz CSD phase shifts.

Figure 6B:
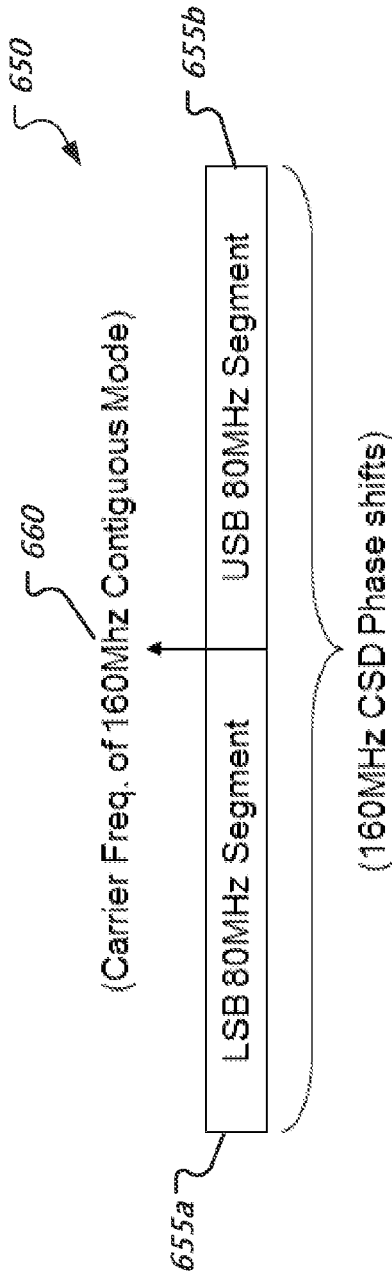
FIG. 6B shows a layout of an example of a 160 MHz composite signal having contiguous frequency segments and a shared carried frequency.

FIG. 6B shows a layout of an example of a 160 MHz composite signal having contiguous frequency segments and a shared carried frequency. The composite signal 650 includes two contiguous frequency segments 655a, 655b that share a single carrier frequency 660. The segments 610a-b include a LSB 80 MHz segment 655a and a USB 80 MHz segment 655b.

Single-radio and multi-radio devices may view the segments 610a-b of FIG. 6A and the segments 655a-b of FIG. 6B either as a single segment for the purpose of computing CSDs (e.g., $N_{seg}=1$) or as two segments (e.g., $N_{seg}=2$). However, for there to be interoperability between single-radio and multi-radio devices, both types of devices should know how to apply and remove CSD phase shifts the same way. To be compatible with single-radio devices, multi-radio devices can transmit a 160 MHz composite signal such that a single-radio device can process the 160 MHz composite signal as a 160

MHz non-composite signal, i.e. $N_{seg}=1$ for any contiguous 160 MHz signal, regardless of single or multiple radios.

Figure 7:
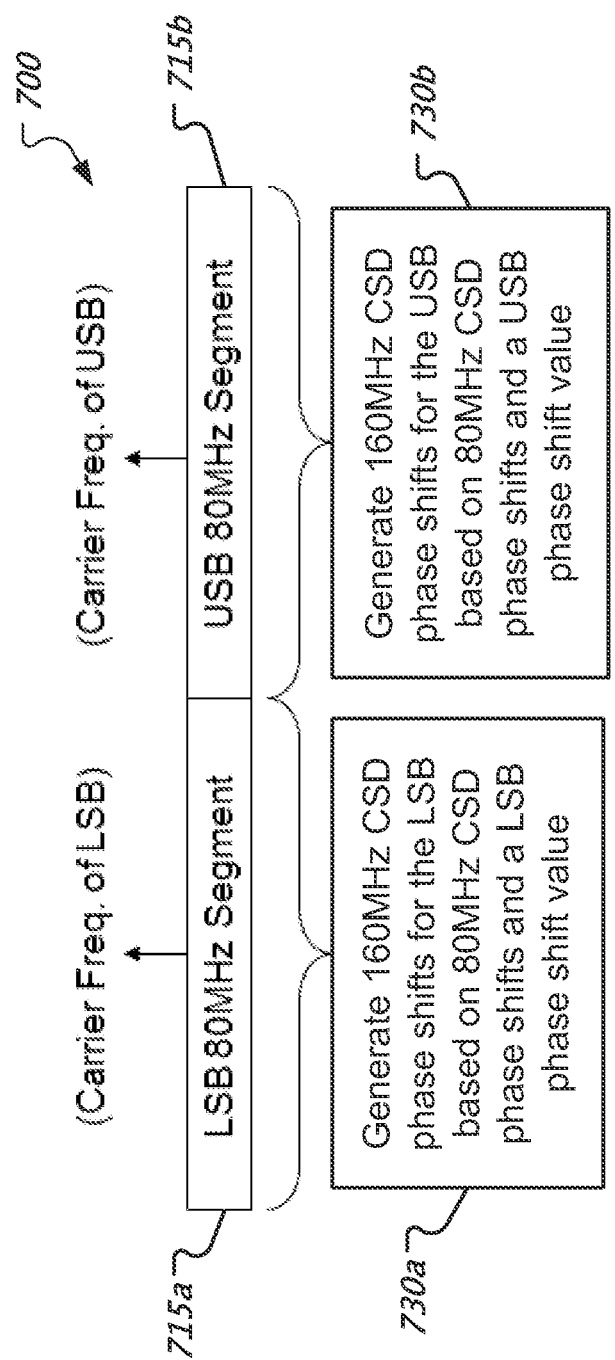
FIG. 7 shows an example of a technique to generate CSD phase shifts for a composite signal that is interoperable with a non-composite signal.

FIG. 7 shows an example of a technique to generate CSD phase shifts for a composite signal that is interoperable with a non-composite signal. A multi-radio device configured to implement the technique of FIG. 7 can use contiguous 160 MHz CSD phase shift values to produce, via two radio units, signals corresponding to the LSB 80 MHz segment 715a and the USB 80 MHz segment 715b. The device can produce a composite signal 700 that includes the frequency segments 715a, 715b. At 730a, the technique includes generating 160 MHz CSD phase shifts for the LSB segment 715a based on 80 MHz CSD phase shifts and a LSB phase shift value. At 730b, the technique includes generating 160 MHz CSD phase shifts for the USB segment 715b based on 80 MHz CSD phase shifts and a USB phase shift value. The 160 MHz LSB CSD phase shifts and the 160 MHz USB CSD phase shifts are equivalent to CSD phase shifts that correspond to a 160 MHz contiguous non-composite signal having a single frequency segment. Thus, in a contiguous 160 MHz mode, regardless of whether two or more radio units are being used to generate the 160 MHz composite signal 700, the $N_{seg}$ value for the above-given expression for $r_{RF}(t)$ is set to one, despite there being two radio units and two segments.

Figure 8:
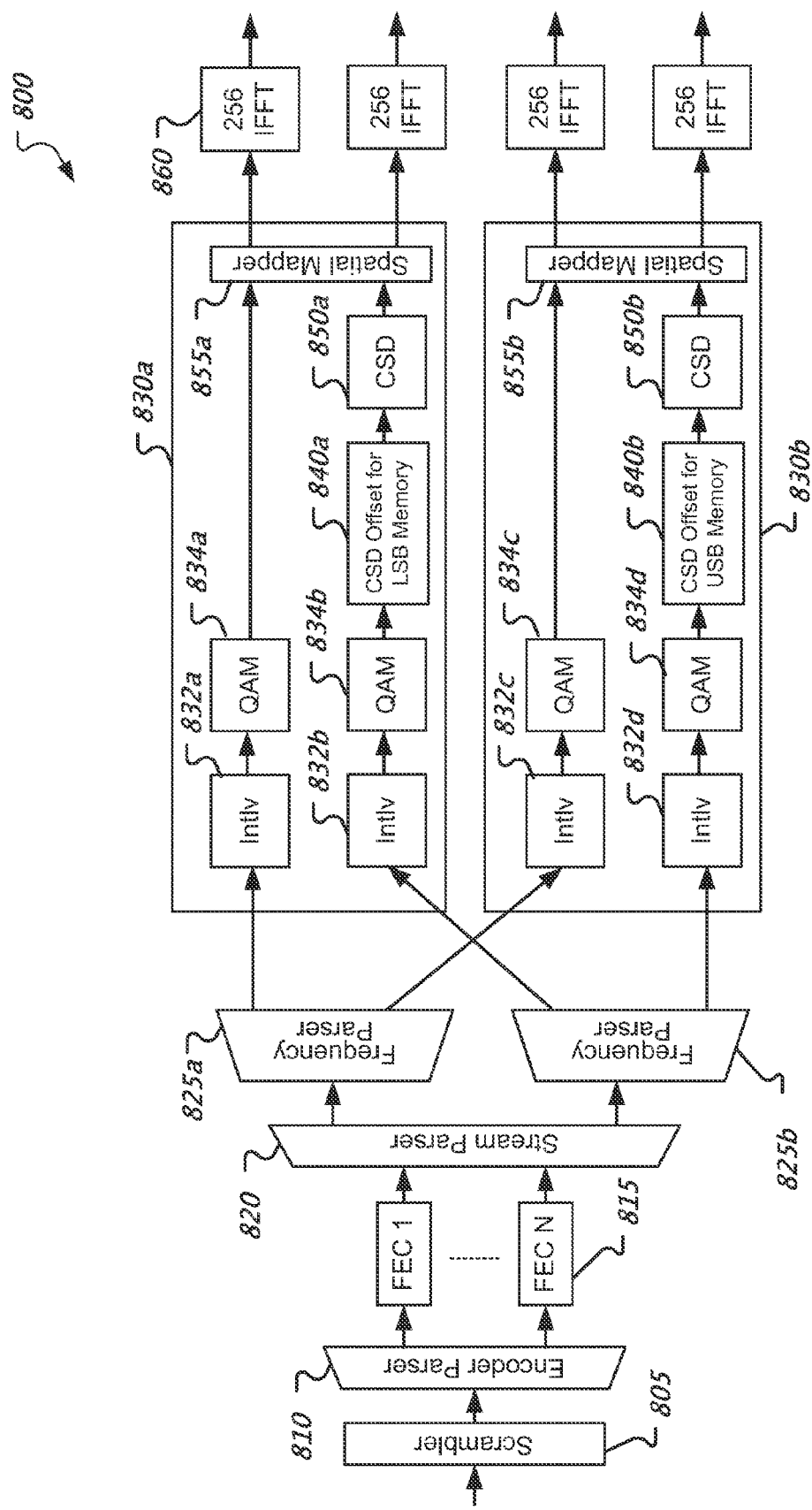
FIG. 8 shows an example of a multi-radio device architecture with memories for CSD offset values.

FIG. 8 shows an example of a multi-radio device architecture with memories for CSD offset values. A device 800 includes a scrambler 805, encoder parser 810, forward error correction (ITC) modules 815, stream parser 820, frequency parsers 825a, 825b, radio pathways 830a, 830b, IFFT modules 860. The device 800 outputs a composite signal that is based on a LSB frequency segment and a USB frequency segment that are generated, respectively via separate radio pathways 830a-b. The radio pathways 830a-b include interleavers (Intlv) 832a-d, QAM modules 834a-d, memories 840a-b, CSD modules 850a-b, and spatial mappers 855a-b. In the radio pathway 830a that generates the LSB frequency segment, the memory 840a is configured to store a CSD offset value for the LSB. The CSD module 850a, which is communicatively coupled with the memory 840a, uses the CSD offset value for the to apply cyclic shift delays to a modulated signal produced by a QAM module 834b. In the radio pathway 830b that generates the USB frequency segment, the memory 840b is configured to store a CSD offset value for the USB. The CSD module 850b, which is communicatively coupled with the memory 840b, uses the CSD offset value for the USB to apply cyclic shift delays to a modulated signal produced by a QAM module 834d. The outputs of the radio pathways 830a-b can be transformed via IFFT modules 860 to produce signals in the time domain for over-the-air transmissions.

Figure 9:
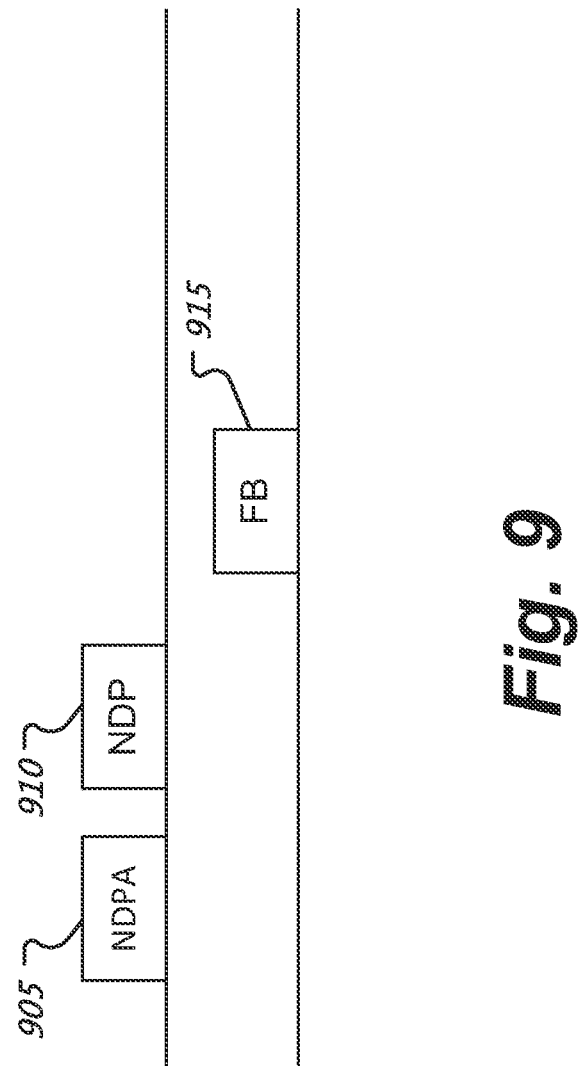
FIG. 9 shows an example of an announcement frame that includes a CSD indicator.

FIG. 9 shows an example of an announcement frame that includes a CSD indicator. Before sending a null data packet (NDP) 910, a first device can send a NDP announcement (NDPA) 905 frame that includes a non-contiguous flag. A non-contiguous flag can be an indicator that provides information regarding an application of CSD phase shifts to a composite signal. For example, the non-contiguous flag can be set to one to indicate a transmission of a 160 MHz contiguous composite signal from two radio units. Based on receiving such an indication, a second device knows that 80 MHz CSD phase shift values were applied on two 80 MHz segments, respectively, in a subsequently received composite signal such as the NDP 910 or other packets. In some implementations, the second device sends a feedback (FB) 915 frame to the first device based on sounding measurements taken from the received version of the NDP 910.

Figure 10:
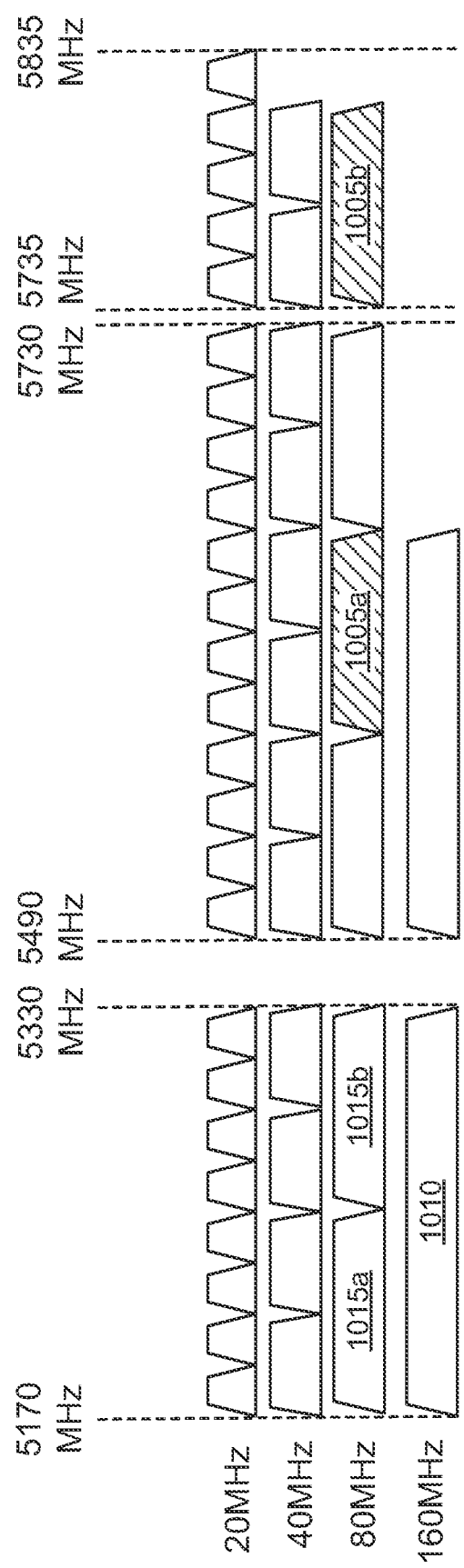
FIG. 10 shows an example of frequency arrangements for WLAN communications.

FIG. 10 shows an example of frequency arrangements for WLAN communications. Some wireless standards partition unlicensed radio spectrum into channels. The channels can be 20 MHz channels, 40 MHz channels, 80 MHz channels, 160 MHz channels, or a combination thereof. The multi-radio device 800 of FIG. 8 can be configured for either contiguous frequency transmissions or non-contiguous frequency transmissions. In non-contiguous frequency transmissions, the device 800 can generate a 160 MHz composite signal via two radio units that are configured to use two non-adjacent 80 MHz channels 1005a, 1005b. In contiguous frequency transmissions, the device 800 can generate a 160 MHz composite signal via two radio units that are configured to use two adjacent 80 MHz channels 1015a, 1015b. Note that a 160 MHz channel 1010 occupies the same space as the two adjacent 80 MHz channels 1015a, 1015b. In contrast to the device 800, a single radio device uses a single radio pathway to produce a 160 MHz non-composite signal via one radio unit that is configured to use the 160 MHz channel 1010.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   generating respective frequency segments of a composite signal, each of the respective frequency segments being based on a segment bandwidth, wherein the respective frequency segments are contiguous in a frequency domain;
   applying respective cyclic shift delay (CSD) phase shifts to the respective frequency segments to produce respective output signals; and
   transmitting the composite signal by transmitting signals that are based on the respective output signals,
   wherein the respective CSD phase shifts, including first CSD phase shifts and second CSD phase shifts, are equivalent to third CSD phase shifts that correspond to a contiguous non-composite signal having a single frequency segment, wherein a bandwidth of the single frequency segment is at least twice the segment bandwidth, and wherein the respective CSD phase shifts are applied such that a device receiving the composite signal uses the third CSD phase shifts that correspond to the contiguous non-composite signal.

2. The method of claim 1, wherein the segment bandwidth is at least 80 MHz.

3. The method of claim 2, wherein a composite bandwidth of the composite signal is at least 160 MHz.

4. The method of claim 1, comprising:
   transmitting an indicator to provide information regarding an application of CSD phase shifts to the composite signal.

5. The method of claim 4, wherein the indicator comprises a flag that indicates a transmission of a contiguous composite signal from at least two radio pathways.

6. The method of claim 1, comprising:
   configuring respective radio pathways, including a first radio pathway and a second radio pathway that are operable for either contiguous frequency transmissions or non-contiguous frequency transmissions, to collectively produce the composite signal in a contiguous frequency mode, wherein configuring the respective radio pathways comprises:
      setting, in the first radio pathway, a first CSD offset for a first frequency segment of the respective frequency segments, wherein the first CSD phase shifts are based on the first CSD offset; and
      setting, in the second radio pathway, a second CSD offset for a second frequency segment of the respective frequency segments, wherein the second CSD phase shifts are based on the second CSD offset.

7. The method of claim 6, wherein applying the respective CSD phase shifts comprises:
   applying, via the first radio pathway, the first CSD phase shifts to the first frequency segment to produce a first output signal; and
   applying, via the second radio pathway, the second CSD phase shifts to the second frequency segment to produce a second output signal.

8. An apparatus comprising:
   means for generating respective frequency segments of a composite signal, each of the respective frequency segments being based on a segment bandwidth, wherein the respective frequency segments are contiguous in a frequency domain;
   means for applying respective cyclic shift delay (CSD) phase shifts to the respective frequency segments to produce respective output signals; and
   means for transmitting the composite signal by transmitting signals that are based on the respective output signals,
   wherein the respective CSD phase shifts, including first CSD phase shifts and second CSD phase shifts, are equivalent to third CSD phase shifts that correspond to a contiguous non-composite signal having a single frequency segment, wherein a bandwidth of the single frequency segment is at least twice the segment bandwidth, and wherein the respective CSD phase shifts are applied such that a device receiving the composite signal uses the third CSD phase shifts that correspond to the contiguous non-composite signal.

9. The apparatus of claim 8, wherein the segment bandwidth is at least 80 MHz.

10. The apparatus of claim 9, wherein a composite bandwidth of the composite signal is at least 160 MHz.

11. The apparatus of claim 8, comprising:
    means for providing an indicator to transmit information regarding an application of CSD phase shifts to the composite signal.

12. The apparatus of claim 11, wherein the indicator comprises a flag that indicates a transmission of a contiguous composite signal from at least two radio pathways.

13. The apparatus of claim 8, comprising:
    means for configuring respective radio pathways, including a first radio pathway and a second radio pathway that are operable for either contiguous frequency transmissions or non-contiguous frequency transmissions, to collectively produce the composite signal in a contiguous frequency mode.

14. The apparatus of claim 13, wherein the means for configuring comprises:
    means for setting, in the first radio pathway, a first CSD offset for a first frequency segment of the respective frequency segments, wherein the first CSD phase shifts are based on the first CSD offset; and
    means for setting, in the second radio pathway, a second CSD offset for a second frequency segment of the respective frequency segments, wherein the second CSD phase shifts are based on the second CSD offset.

15. The apparatus of claim 14, wherein the means for applying comprises:
    means for applying, via the first radio pathway, the first CSD phase shifts to the first frequency segment to produce a first output signal; and
    means for applying, via the second radio pathway, the second CSD phase shifts to the second frequency segment to produce a second output signal.

16. A non-transitory computer-readable medium embodying a computer program operable to cause a data processing apparatus to perform operations comprising:
- generating respective frequency segments of a composite signal, each of the respective frequency segments being based on a segment bandwidth, wherein the respective frequency segments are contiguous in a frequency domain;
- applying respective cyclic shift delay (CSD) phase shifts to the respective frequency segments to produce respective output signals; and
- transmitting the composite signal by transmitting signals that are based on the respective output signals,
- wherein the respective CSD phase shifts, including first CSD phase shifts and second CSD phase shifts, are equivalent to third CSD phase shifts that correspond to a contiguous non-composite signal having a single frequency segment, wherein a bandwidth of the single frequency segment is at least twice the segment bandwidth, and wherein the respective CSD phase shifts are applied such that a device receiving the composite signal uses the third CSD phase shifts that correspond to the contiguous non-composite signal.

17. The computer-readable medium of claim 16, wherein the segment bandwidth is at least 80 MHz.

18. The computer-readable medium of claim 16, wherein a composite bandwidth of the composite signal is at least 160 MHz.

19. The computer-readable medium of claim 16, the operations comprising:
- configuring respective radio pathways, including a first radio pathway and a second radio pathway that are operable for either contiguous frequency transmissions or non-contiguous frequency transmissions, to collectively produce the composite signal in a contiguous frequency mode, wherein configuring the respective radio pathways comprises:
- setting, in the first radio pathway, a first CSD offset for a first frequency segment of the respective frequency segments, wherein the first CSD phase shifts are based on the first CSD offset; and
- setting, in the second radio pathway, a second CSD offset for a second frequency segment of the respective frequency segments, wherein the second CSD phase shifts are based on the second CSD offset.

20. A system comprising:
- circuits configured to generate respective frequency segments of a composite signal, each of the respective frequency segments being based on a segment bandwidth, wherein the respective frequency segments are contiguous in a frequency domain,
- wherein the circuits are configured to apply respective cyclic shift delay (CSD) phase shifts to the respective frequency segments to produce respective output signals for the composite signal,
- wherein the respective CSD phase shifts, including first CSD phase shifts and second CSD phase shifts, are equivalent to third CSD phase shifts that correspond to a contiguous non-composite signal having a single frequency segment, wherein a bandwidth of the single frequency segment is at least twice the segment bandwidth, and wherein the respective CSD phase shifts are applied such that a device receiving the composite signal uses the third CSD phase shifts that correspond to the contiguous non-composite signal.

21. The system of claim 20, wherein the segment bandwidth is at least 80 MHz, and wherein a composite bandwidth of the composite signal is at least 160 MHz.

22. The system of claim 20, comprising:
- processor electronics configured to configured to control the circuits, including a first radio unit and a second radio unit that are operable for either contiguous frequency transmissions or non-contiguous frequency transmissions, to collectively produce the composite signal in a contiguous frequency mode.

23. The system of claim 22, wherein processor electronics are configured to:
- set, in the first radio unit, a first CSD offset for a first frequency segment of the respective frequency segments, wherein the first CSD phase shifts are based on the first CSD offset; and
- set, in the second radio unit, a second CSD offset for a second frequency segment of the respective frequency segments, wherein the second CSD phase shifts are based on the second CSD offset.

* * * * *